March 17, 1959  A. BRUEDER  2,878,056
SLIDING GLASS

Filed Aug. 13, 1956  3 Sheets-Sheet 1

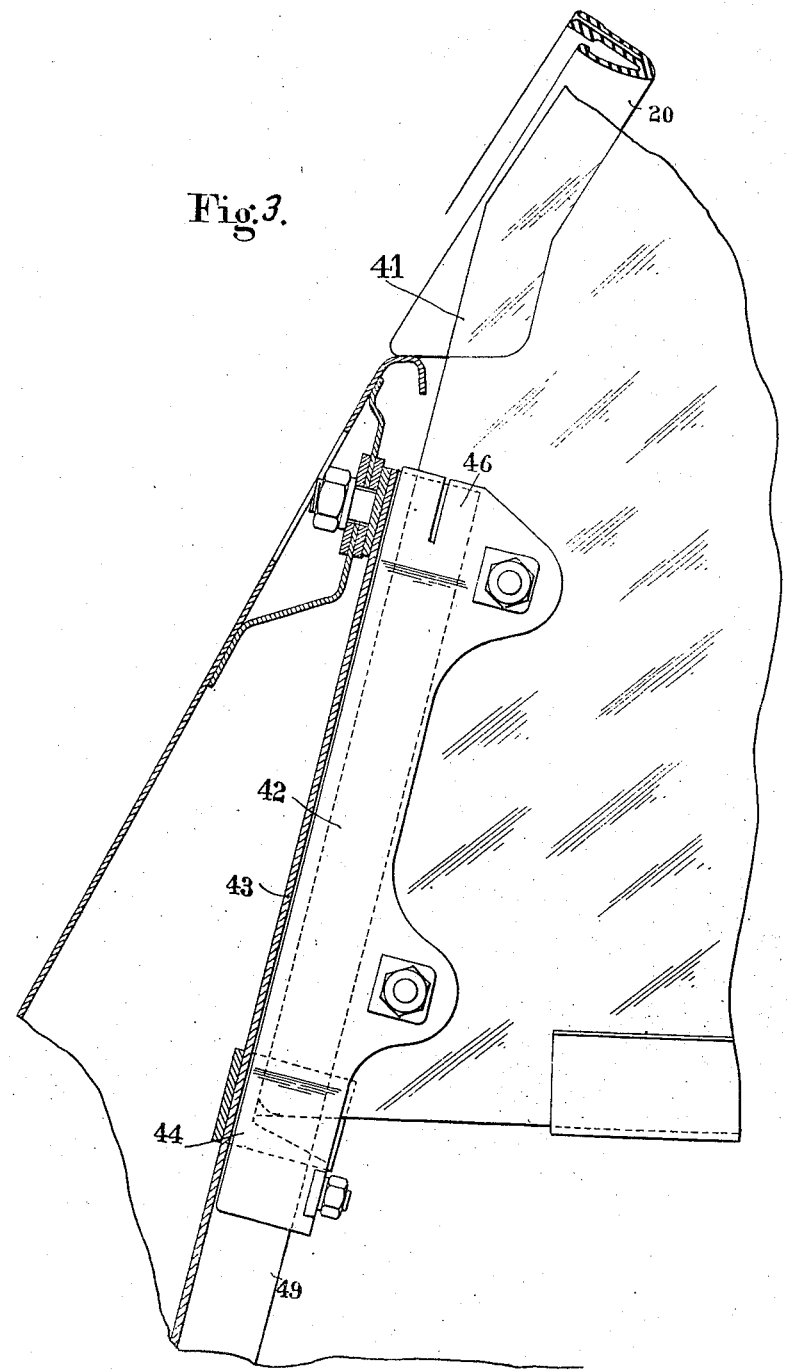

March 17, 1959  A. BRUEDER  2,878,056
SLIDING GLASS
Filed Aug. 13, 1956
3 Sheets-Sheet 3
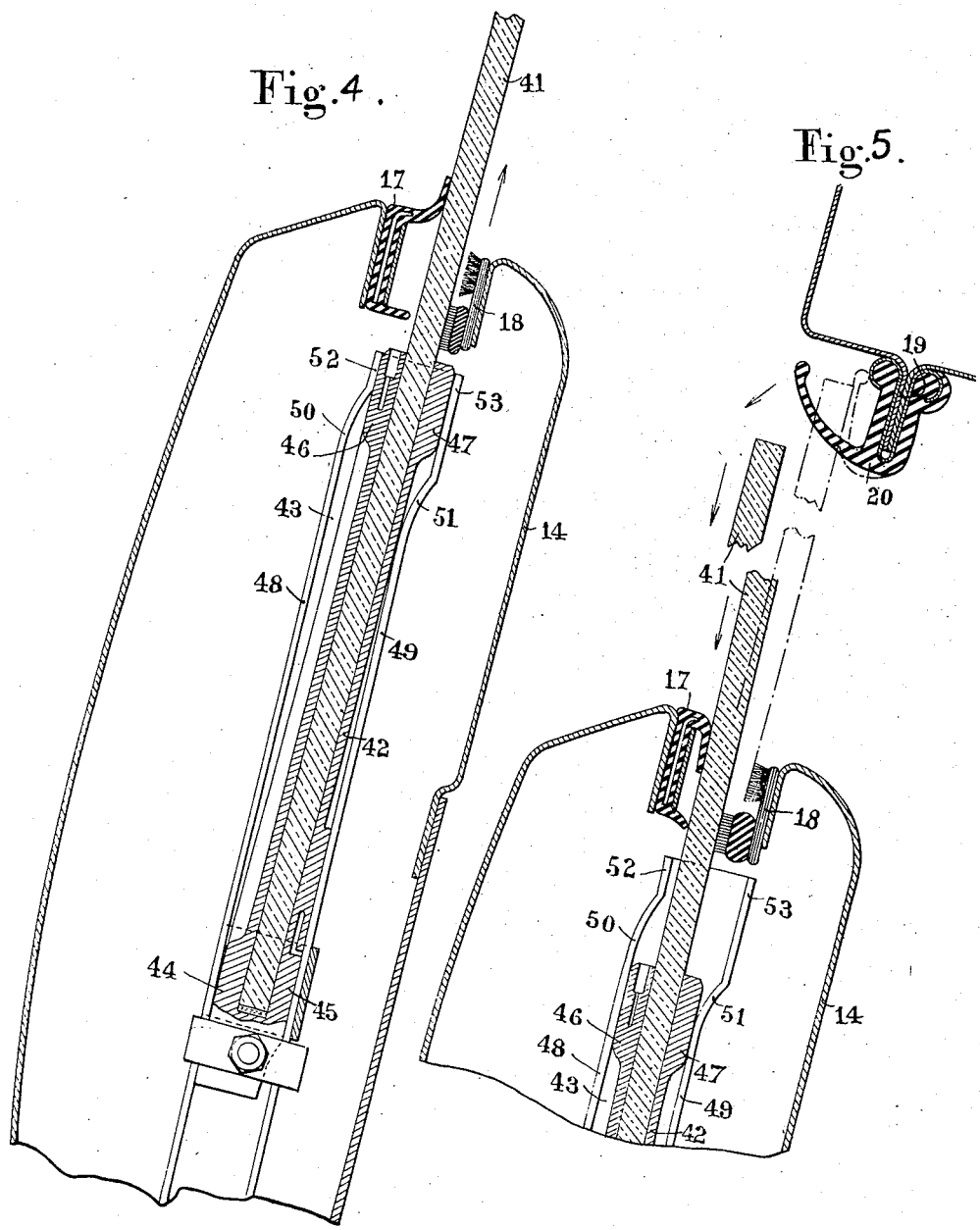

United States Patent Office
2,878,056
Patented Mar. 17, 1959

2,878,056

SLIDING GLASS

Antoine Brueder, Paris, France, assignor to Société Anonyme André Citröen, Paris, France Application August 13, 1956, Serial No. 603,645

Claims priority, application France March 22, 1956

1 Claim. (Cl. 296—44)

This invention relates to sliding glasses, particularly for automotive vehicles.

As a rule, sliding glasses mounted on the bodies of automotive vehicles are guided throughout their height, during their sliding movement, both upwards and downwards, and in their raised or closed position their upper edge is held in a groove or like member provided for this purpose; however, in certain cases, notably in drop-head coupés, only one of the side edges of the glass is guided; the other side edge, as well as the top edge, which frequently form together a single edge, are caused as in other "hard-top" cars to engage a groove formed for this purpose in the lower corresponding edge of the collapsible hood.

Now it is the object of the invention to provide an improved sliding-glass arrangement for automotive vehicle which is characterized in that the glass is guided only at its lower portion, behind the door panels in which it is mounted, and that the side and top edges of the glass, instead of engaging a groove, are simply pressed from the outside against a sealing strip provided for this purpose and fitted at the top and lateral portions of the window.

To compensate the resulting absence of guiding means and prevent the glass from vibrating in its uppermost position, the glass is resiliently clamped between adequate damping pads, the pressure exerted by these pads being sufficient to provide the desired damping action without producing any friction likely to impair the smoothness and ease of operation of the winding mechanism.

It has been found, according to this invention, that it was possible to improve to a substantial degree the smoothness of operation of glass winding mechanisms associated with sliding glass arrangements constructed in accordance with the teachings of this invention, in both opening and closing movements, by eliminating any contact between the upper and lateral edges of the glass and the aforesaid sealing strip, as long as the glass is not completely closed; as a matter of fact, a complete sealing engagement between the glass edge and the window frame is not necessary as long as the glass is not completely closed.

To this end, the slide disposed behind the door panels for guiding the lower portion of the member supporting the glass edges has a curved upper portion adapted to cause the glass to pivot about a longitudinal axis so that in its closed position the upper edges of the glass will be urged against the frame-forming strip to provide the desired sealing engagement therebetween.

Other features and advantages of this inveniton will become apparent as the following description proceeds with reference to the attached drawings forming part of this specification and illustrating diagrammatically by way of example a few embodiments thereof. In the drawings:

Figure 3 is a longitudinal section taken across the upper portion of the guiding channel and illustrating the front-view appearance of one corner of the glass and the relevant support, and Figures 4 and 5 are other fragmentary cross-sections illustrating the glass in its closed, sealing position and during the opening or closing movement thereof, respectively.

Figure 1:
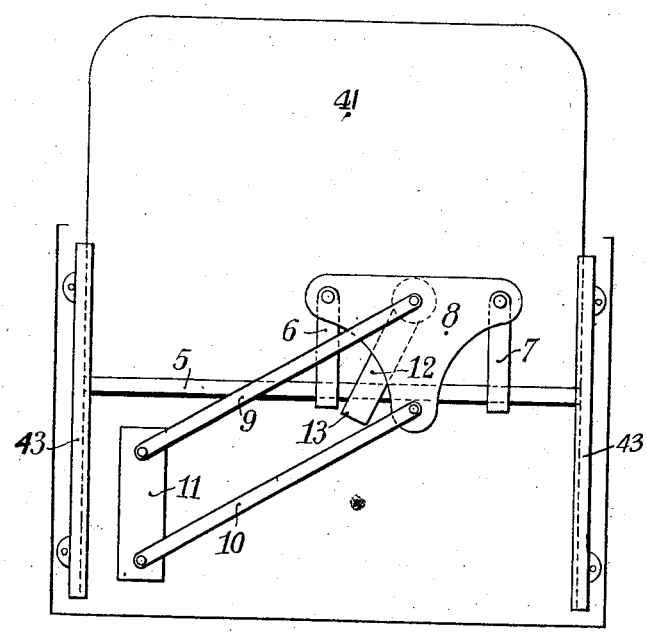
Figure 1 is a front view of the mechanism controlling the movement of the sliding glass.

Behind the door panel is secured as shown in Figure 1 a pair of lateral guiding channels 43, 43 having positioned in sliding engagement therein the side edges of the sliding glass 41; this sliding glass 41 is supported by a transverse U-sectioned member 5 suspended from a pair of hook-shaped links 6, 7 secured in turn to a movable supporting plate 8; this plate 8 is pivotally connected to ends of a pair of parallel links 9, 10 having their other ends similarly connected to a stationary plate 11 to constitute a parallel motion as already well known in the art.

It is evident that with this device when the links 9, 10 are pivoted in one or the other direction relative to the fixed member 11 the supporting plate 8 and therefore the hook-shaped links 6, 7, transverse member 5 and glass 41 are moved up or down.

The supporting member 8 has secured thereon through any suitable means one limb 12 of a clip-spring 13 in which the lower portion of the glass 41 is located; felt or like pads not seen in the drawing are provided between each limb of the clip 13 and the relevant glass face.

It is apparent that with this arrangement the glass 41 may slide between the pads which prevent it from vibrating when the vehicle is running.

Figure 2:
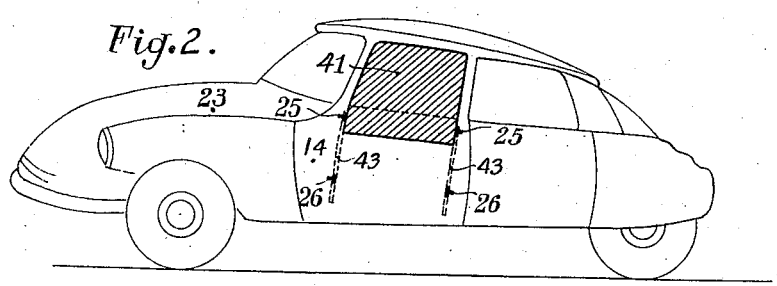
Figure 2 is a simplified view showing a passenger car equipped with a sliding glass according to this invention.

As shown in Figure 2 the lower portion of the sliding glass 41 is guided within the door panel 22 of the passenger car 23 by a pair of side guiding channels 43 secured to the door panel 14 at two locations designated by the reference numerals 25, 26 respectively at the upper and lower portions of these channels 43.

As shown in Figs 3 to 5, the glass 41 is carried on either side, at its lower portion, by supports 42 adapted to slide in rigid guiding channels 43 rigidly secured in the door or body panel 14; each support 42 comprises at its lower portion and on either side of the glass 41 thicker portions 44, 45 and at its upper portion, also on either side of the glass 41, other thicker portions 46, 47; these thicker portions 44, 45, 46, 47 are so shaped that the support 42 and glass 41 are guided in smooth frictional engagement between the two wings 48, 49 of the guiding channel 43 and that the glass 41 will slide in a direction parallel to its main surfaces during the first part of the glass-closing operation as shown in full lines in Figure 5.

At their upper portions the wings 48, 49 of the guiding channel 43 are bent inwards at 50, 51 to constitute a curved connection leading to another rectilinear portion 52, 53, having substantially the same spacing and the same direction as the wings 48, 49. As it emerges from the door or body panel 14 the glass 41 is clamped between two member 17, 18. The internal contour of the window aperture is formed with an inner fillister or flange 19 on which a sealing weather strip 20 of same material as member 17 is fitted.

Thus, upon completion of the glass-closing operation and as shown in Figs. 5 and 4, the thicker portions 46, 47 of the support 42, after having been guided along a rectilinear path by the wings 48, 49 are deflected inwards along the curved portions 50, 51 until they are locked between the aforesaid upper portions 52, 53, in full lines in the positions shown in Fig. 4 and in dotted lines in Figure 5. Then, the inclination of the glass 41, is such, with respect to its initial position, that the side and upper edges of the glass are urged against the sealing strip 20 mounted on the fillister 19 of the window frame to provide the desired sealing engagement therebetween.

During the glass-closing movement the reverse steps are effected in that the thicker portions 46, 47 of the upper portion of the support 42 are firstly moved outwards so as to cause the glass 41 to pivot or tilt to the position shown in full lines in Figure 5, thereby moving immediately its upper and side edges away from the sealing strip 19, whereafter the glass will be lower in a direction substantially parallel to its main surfaces while reducing to a minimum any frictional contact to said minimum quantity with the only guiding channels 43.

In this embodiment it is clear that during the initial portion of the glass closing movement the edges of the glass move with some clearance along the sealing weather strip, so that this portion of the glass travel may take place without any frictional engagement between the glass edges and the sealing weather strip, thereby ensuring a longer useful life of the strip and permitting a very smooth and easy control movement. In addition, the glass edge engages the strip before the closing movement is completed and the latter it attended, along a distance which is a function of the shape of the guide channels, by a frictional engagement which provides a stability free of any vibration in the closed position and also in an almost closed position permitting if desired a moderate aeration. Moreover, the tilting movement of the glass towards the sealing strip during its closing movement is essentially gradual and, by construction and a proper selection of the length of the curved portions 50 and 51 forming the extensions of the rectilinear portions 48, 49 of the wings of the guide channel 43, it is possible to spread this movement through any desired fraction of the entire amplitude of the closing movement.

Of course, the few embodiments shown and described herein are given solely by way of example and should not be construed as limiting the purpose of the invention, as many modifications may be brought thereto without departing from the spirit and scope of the invention as set forth in the appended claim.

What I claim is:

A mounting of sliding glass pane in a hollow panel disposed under a window frame the outer contour of which is provided with a fillister, said mounting comprising a pair of rigid supports rigidly secured along the lower portions of the lateral edges of the glass pane and permanently housed in said hollow panel, each of said supports having two widened bearing ends, a pair of rigid guide channels rigidly secured internally of said hollow panels, said glass pane being slidably mounted in said guide channels by engaging in each guide channel the widened bearing ends of the support of one of the two lateral edges of the glass pane, a weather strip inserted in said frame fillister, each of said guide channels having from their bottom up a main rectilinear portion the guiding action of which produces a movement of translation of the glass pane when said glass is raised and as long as the upper bearing ends sliding in said guide channels remains in said rectilinear portions, said guide channels having upper extensions in the form of inswept portions adapted to tilt the glass pane inwards thereby gradually causing the glass contour portion which rises above said panel to bear against said weather strip as the upper bearing ends sliding in said guide channels moves upwards in said inswept portions, said guide channels terminating with upper rectilinear portions substantially parallel to the main rectilinear portion by which the glass pane is guided during a short movement of translation causing the glass contour portion which rises above the panel to slide against said weather strip as the upper bearing ends complete their upward movement in said upper rectilinear portions of said guide channels.

References Cited in the file of this patent

UNITED STATES PATENTS

| | | |
|---|---|---|
| 1,826,865 | Carr | Oct. 13, 1931 |
| 2,001,778 | Field | May 21, 1935 |
| 2,594,717 | Bailey | Apr. 29, 1952 |
| 2,763,508 | Gelfand et al. | Sept. 18, 1956 |